United States Patent [19]
Klinchuch

[11] 3,955,426
[45] May 11, 1976

[54] MASS UNBALANCE MODULATION PICKOFF ATTENUATION AND SPEED CONTROL IN ELECTROSTATIC GYROSCOPE SYSTEM

[75] Inventor: John F. Klinchuch, Orange, Calif.

[73] Assignee: Rockwell International Corporation, El Segundo, Calif.

[22] Filed: June 19, 1974

[21] Appl. No.: 480,786

[52] U.S. Cl. .................................. 74/5.6 D; 308/10
[51] Int. Cl.² .................................. G01C 19/28
[58] Field of Search ................... 74/5, 5.6 R, 5.6 D, 74/5.6 E, 5.7, 5.4; 308/10

[56] References Cited
UNITED STATES PATENTS

| | | | |
|---|---|---|---|
| 3,262,325 | 7/1966 | Senstad | 308/10 X |
| 3,412,618 | 11/1968 | Staats | 74/5.7 |
| 3,469,457 | 9/1969 | Staats | 74/5.4 |
| 3,482,455 | 12/1969 | Boltinghouse et al. | 74/5.6 D |
| 3,742,767 | 7/1973 | Bernard et al. | 308/10 X |
| 3,785,709 | 1/1974 | Atkinson | 308/10 |
| 3,847,026 | 11/1974 | Boltinghouse et al. | 74/5.6 D |

Primary Examiner—Charles J. Myhre
Assistant Examiner—William C. Andrew
Attorney, Agent, or Firm—H. Fredrick Hamann; Rolf M. Pitts; George Jameson

[57] ABSTRACT

An improved electrostatic gyro system wherein, for each of the axes of suspension of a rotor, pickoff electronics are responsive to electrode pickoff signals for developing combined mass unbalance modulation (MUM) and servo signals from which a MUM signal reconstruction circuit demodulates and reconstructs only the MUM signal. The reconstructed MUM signal is then subtracted in servo suspension electronics from the combined MUM and servo signals to substantially develop only the servo signal containing only rotor displacement information. This servo signal is then fed to a servo network which does not require a notch filter. The output of the servo network is then developed into force signals to enable an associated pair of plate charge amplifiers to electrostatically suspend the rotor properly between an associated pair of electrodes. In addition, the reconstructed MUM signals are utilized by speed control electronics to develop and add highly accurate and precise speed control signals to the output of the servo network to provide a very precise speed control of the rotor without the use of any notch filter.

14 Claims, 13 Drawing Figures

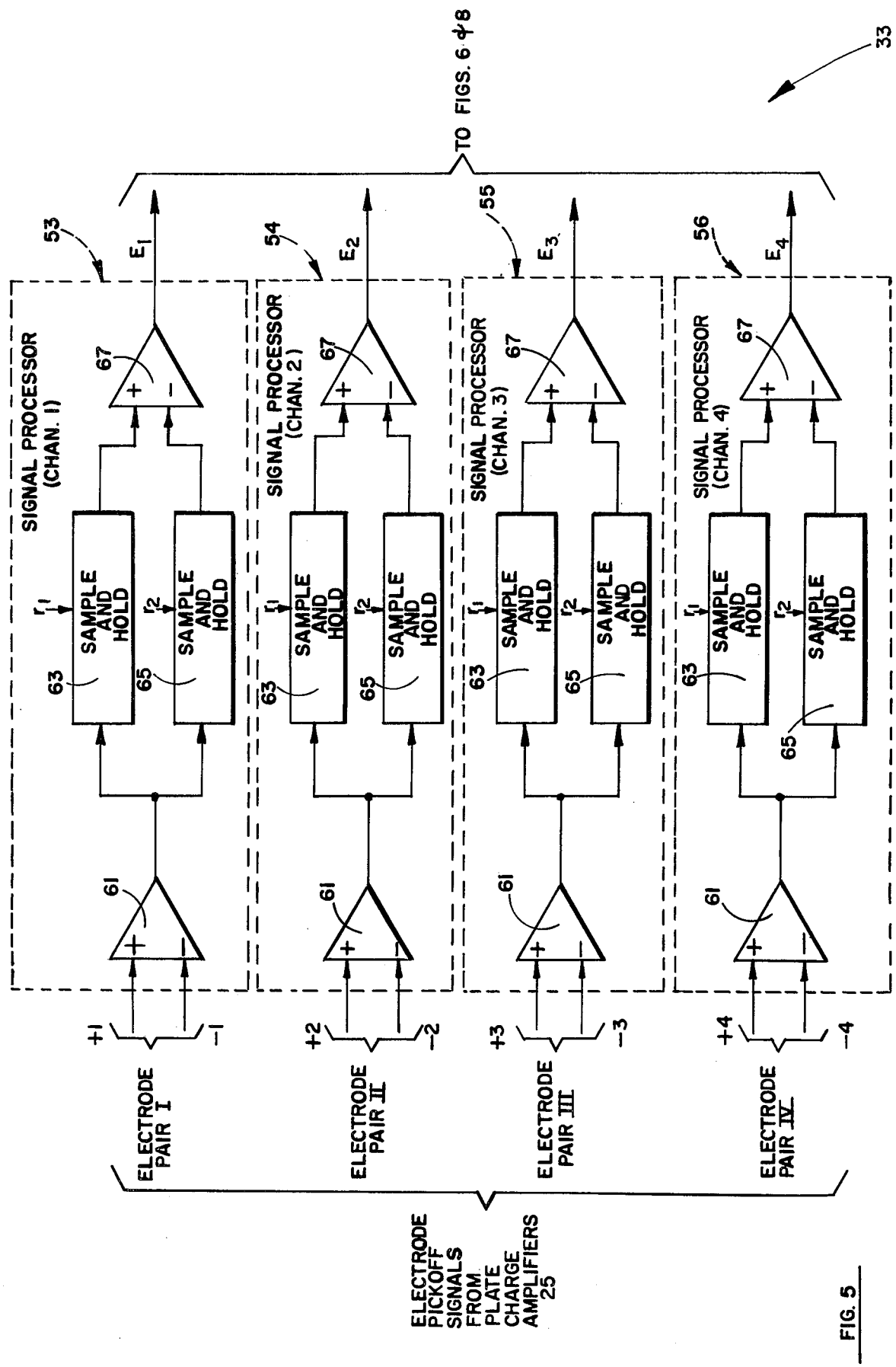

MASS UNBALANCE MODULATION PICKOFF ATTENUATION AND SPEED CONTROL IN ELECTROSTATIC GYROSCOPE SYSTEM

The invention herein described was made in the course or under a Contract or Subcontract thereunder with the United States Air Force.

1. Field of the Invention

This invention relates to gyroscope of the electrostatic levitation type which utilize a spinning ball or rotor whose center of mass is displaced from the spin axis of the rotor, and particularly to an electrostatic gyroscope system for providing improved speed control and mass unbalance modulation (MUM) pickoff attenuation by means of MUM signal reconstruction.

2. Description of the Prior Art

An electrostatic gyroscope is a free rotor type of gyroscope in which the rotor support forces are derived from an electric field. The rotor is generally an aluminum or beryllium sphere which may be either solid or hollow. The electrostatic support consists generally of a plurality of pairs of spherical segment electrodes or plates dispersed about the rotor.

A recent development in prior art electrostatic gyroscope suspension systems is the use of a mass unbalanced rotor, instead of induction pickoff schemes, to obtain attitude readout. Attitude in the relative orientation of the spin axis of the rotor to, for example, the case housing the rotor. Attitude readout can be obtained by detecting the amplitude of the modulation of the electrode voltages caused by the mass unbalance rotor as it spins around its spin axis. The plate voltage modulation results from the pendulosity of the rotor, which causes the gap to change between the rotor and the plate electrodes as the rotor is spinning. The maximum plate modulation occurs in the plane of the rotating pendulosity vector. Thus, the pickoff signal consists of two signal components, a servo signal indicative of the linear displacement of the rotor and a mass unbalance modulation (MUM) signal resulting from the pendulosity of the spinning rotor.

Prior art electrostatic gyroscope suspension systems, such as are disclosed in U.S. Pat. Nos. 3,482,455 and 3,697,143, utilize notch filters to provide speed control and to attenuate the MUM signals to the plate charge amplifiers. These notch filters provide the filter characteristics for rotor speed control similar to the type described in U.S. patent application (Continuation) Ser. No. 427,000, filed Dec. 20, 1973, entitled "Speed Control for an Electrostatically Supported Ball Gyroscope" by James L. Atkinson et al. The attenuation of the MUM signal is required to minimize the gain at the rotor speed. A high gain at the rotor speed would reduce the size of the orbit of the rotor and, therefore, reduce the MUM signal in each pickoff signal to a very small amplitude, making it difficult to obtain attitude readout information. A high gain at the rotor speed or spin frequency also causes large forces which are synchronous with the rotor motion, thereby producing high drift rates. To illustrate, the spinning ball rotor is not perfectly round. As a result, tangential forces on the rotor are produced. These tangential forces cause a torque to be applied to the rotor, resulting in a rotor drift. This rotor drift is proportional to torque divided by angular momentum. Since the angular momentum is directly proportional to rotor speed, changes in rotor speed can cause large changes in the rotor drift rate.

The notch filter may provide the required attenuation of the MUM signal at the rotor spin frequency, but it is a very high "Q" circuit. As a result, small temperature and/or component variations in the notch filter result in larger phase and gain changes at the rotor speed or spin frequency. This, in turn, changes attitude readout and drift rate, which are undesirable and should be avoided.

SUMMARY OF THE INVENTION

Briefly, a novel system is provided for providing a very precise rotor speed control and substantially attenuating the MUM signals from the subsequent signals acting on the rotor in an electrostatic gyroscope, without the use of a conventional notch filter. In a preferred embodiment, for each of the axes of suspension of a rotor, pickoff electronics convert electrode pickoff signals into a composite signal containing both MUM and servo signals, a second circuit demodulates the composite signal and reconstructs only the MUM signal, servo suspension electronics subtract the reconstructed MUM signal from the composite signal to develop a substantially pure servo signal which is then changed into force signals to enable an associated pair of plate charge amplifiers to electrostatically suspend the rotor properly between an associated pair of electrodes. In addition, speed control electronics are responsive to the reconstructed MUM signal for developing and adding highly accurate speed control signals to the substantially pure servo signal to provide a very precise speed control of the rotor with long term stability without the use of any notch filter.

It is therefore an object of this invention to provide an improved electrostatic gyroscope (ESG) suspension system.

Another object of this invention is to provide a system for improving the attitude and drift rate performance in an ESG suspension system.

Another object of this invention is to provide a system which substantially attenuates the ESG MUM attitude signals from the subsequent signals acting on the ESG rotor without the use of a conventional notch filter.

A further object of this invention is to provide a system which speed controls a mass unbalanced ESG rotor with a high degree of precision and long term stability.

BRIEF DESCRIPTION OF THE DRAWINGS

These and other objects, features and advantages of the invention, as well as the invention itself, will become more apparent to those skilled in the art in the light of the following detailed description taken in consideration with the accompanying drawings wherein like reference numerals indicate like or corresponding parts throughout the several views and wherein:

FIG. 5 is a block diagram of the pickoff electronics of FIG. 2;

DESCRIPTION OF THE PREFERRED EMBODIMENT

Figure 1:
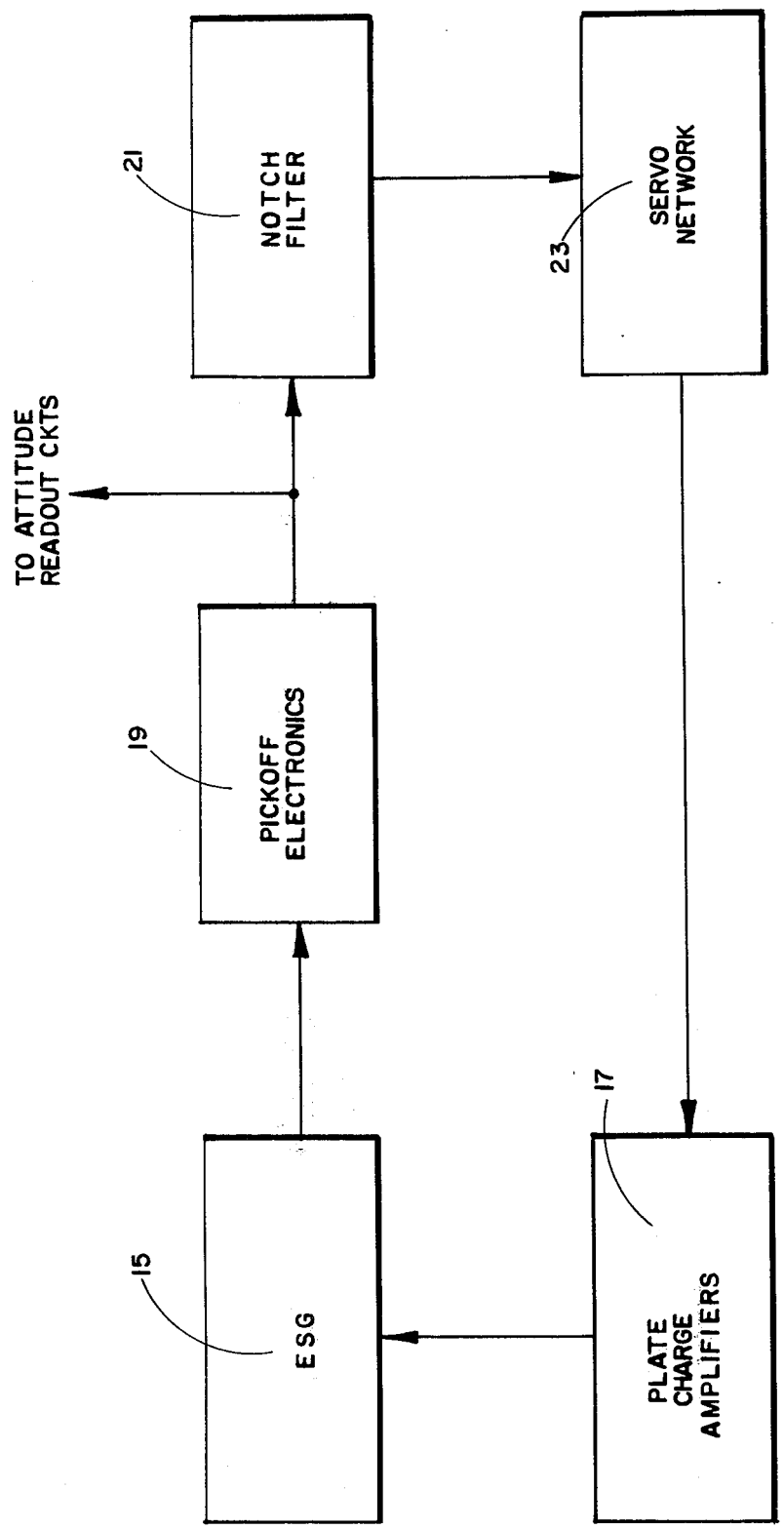
FIG. 1 is a simplified block diagram of one channel of a prior art ESG system that utililzes a notch filter.

Referring now to the drawings, FIG. 1 illustrates a simplified block diagram of a conventional, or prior art, electrostatically supported gyroscope system. An electrostatic gyroscope (ESG) 15 comprises a conductive spherical ball or rotor (not shown) which spins about an axis and is electrostatically supported among pairs of plate electrodes (not shown), with each electrode of a pair being diametrically opposed to the other electrode in that pair. As a result, each pair of electrodes can represent one axis of levitation or suspension, i.e., X-axis, in the system. To simplify the explanation of FIG. 1, only the channel representative of one axis (X-axis) of suspension will now be discussed.

Charge signals from plate charge amplifiers 17 are applied to the X-axis electrodes to maintain the rotor in an essentially central position therebetween. The displacement of the ESG rotor between each pair of electrodes is determined by measuring the electrode voltages when the charge signals are applied to the electrodes. To accomplish this, pickoff electronics 19 are utilized to pick off a portion of each of the voltages applied to the electrodes. In response to the pickoff signals from the X-axis, the pickoff electronics 19 develops an output signal proportional to the voltage difference between the X-axis electrodes. This displacement information is utilized by a notch filter 21 and servo network 23 to control the charge applied by the plate charge amplifiers 17 to the X-axis electrodes. By this means, the rotor is electrostatically suspended between the X-axis electrodes. In a like manner, the spinning rotor is suspended between pairs of electrodes in other axes (not shown).

To enable the attitude, or relative orientation of the spin axis of the rotor with respect to, for example, the case (not shown) housing the rotor, to be obtained, the rotor is given a pendulosity or mass unbalance by manufacturing it such that the center of mass is displaced from the center of geometry. When the rotor is at its proper speed, the spin axis of the rotor passes through the center of mass. This pendulosity, therefore, causes the gap to change between the rotor and the plate electrodes as the rotor is spinning. As a result, a mass unbalance modulation (MUM) signal is induced into the plate voltages as the rotor spins around its axis. Thus, each pickoff signal consists of two components, the linear displacement of the rotor and the MUM signal resulting from the pendulosity of the rotating spherical rotor.

Any change in the angle between the rotor spin axis and an axis through the plate electrodes produces a change in the amplitude of the MUM signal. The maximum modulation, and hence amplitude of MUM signal, occurs in the plane of the rotating pendulosity vector. Therefore, the attitude of the spin axis of the rotor can be obtained by detecting the amplitude of the MUM signal on the pair of opposing plates in each of the axes of suspension. In addition, the direction of change in the relative orientation of the rotor spin axis can be detected by comparing the phases of the MUM signals from the pairs of electrodes. Therefore, the MUM signals in the pickoff signals from the pickoff electronics 19 are accordingly extracted and utilized by attitude readout circuits (not shown).

The notch filter 21 has two very important functions. The first is to attenuate the MUM signal to the plate charge amplifiers, while the second is to provide speed control.

The attenuation of the MUM signal is required to minimize the gain at the rotor speed. A high gain at the rotor speed would reduce the size of the orbit of the rotor and therefore reduce the MUM signal to a very small amplitude, making it difficult to obtain attitude readout information. In addition, a high gain at the rotor spin frequency causes large forces which are synchronous with the rotor motion, producing high drift rates. The notch filter 21 provides an attenuation of the MUM signal, but it is a very high Q circuit. Consequently, small component variations, due to aging, temperature, humidity, etc., result in large phase and gain changes at the rotor spin frequency. This, in turn, changes attitude readout and drift rate, which is to be avoided.

Figure 2:
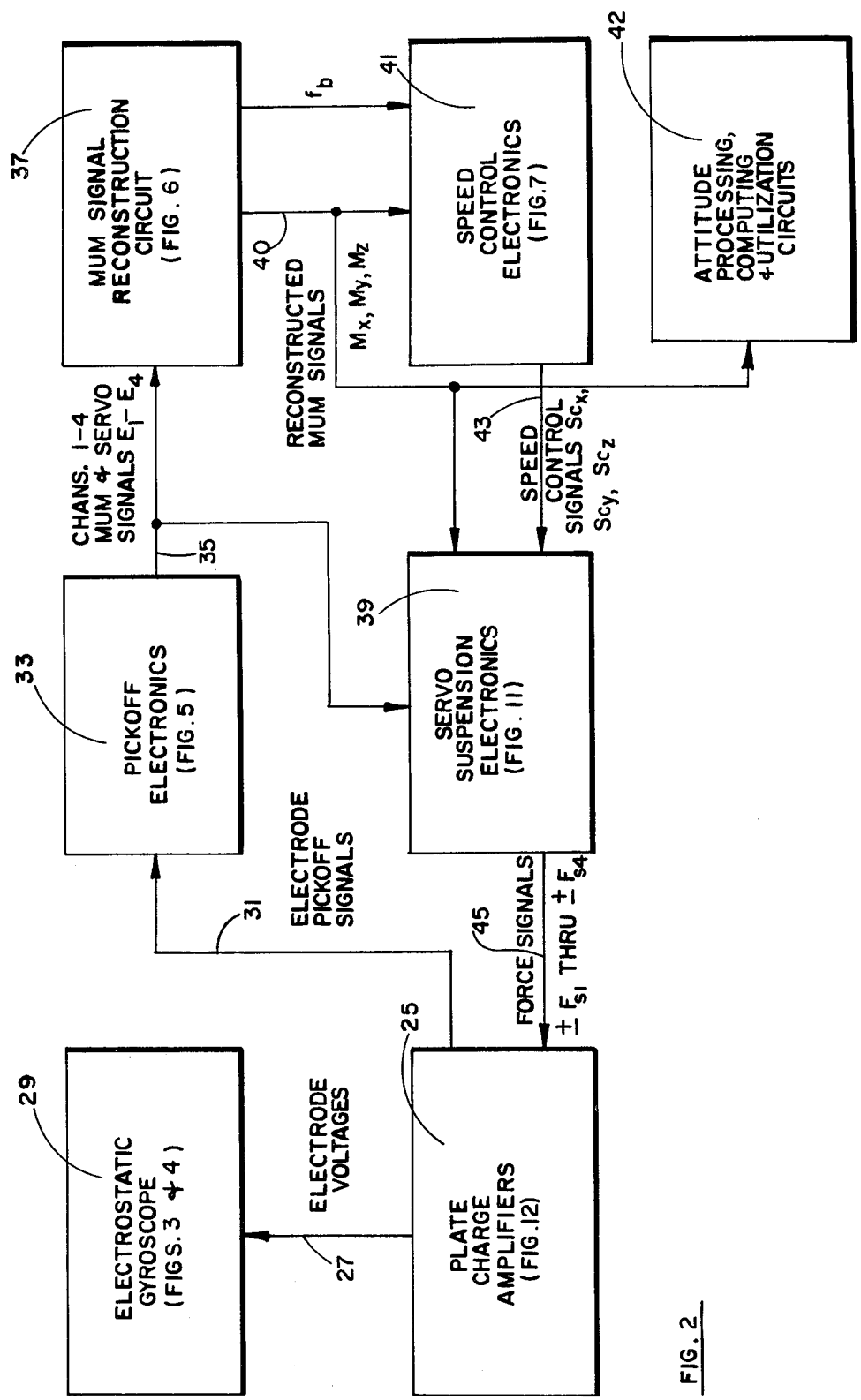
FIG. 2 is a simplified block diagram of an ESG system which incorporates the invention.

Referring now to FIG. 2, an ESG system is illustrated which incorporates the invention. Basically this system utilizes circuitry which provides precision speed control and MUM attitude pickoff signal attenuation from the signals subsequently acting upon the rotor, without the use of a conventional notch filter.

Plate charge amplifiers 25 supply electrode voltages by way of a composite line 27 to a plurality of associated pairs of electrodes (FIGS. 3 and 4) in an electrostatic gyroscope 29 to electrostatically suspend a mass unbalanced spherical rotor or ball (FIG. 3) thereamong. For the purposes of the subsequent description, four pairs of electrodes will henceforth respectively be utilized in four axial channels of suspension. However, it should be understood that a different number of pairs of electrodes or channels could be utilized in conformance with the teachings of this invention.

Figure 3:
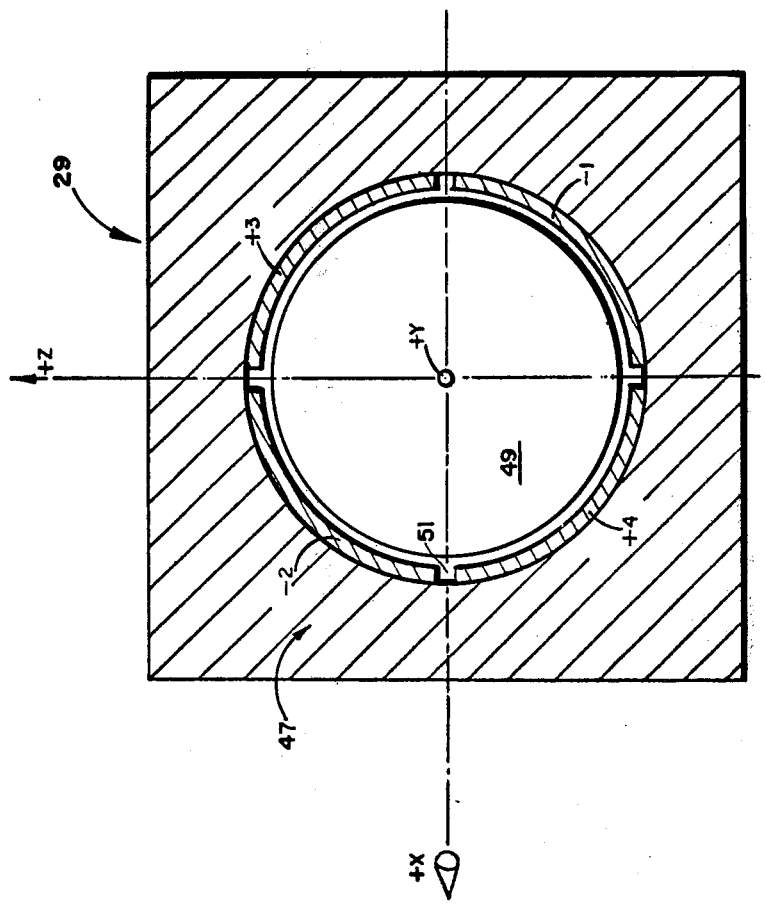
FIG. 3 illustrates in a sectioned view an electrically conductive ball rotor positioned for levitation between a plurality of electrodes in the electrostatic gyroscope of FIG. 2.

Electrode pickoff signals, which contain MUM and displacement (or servo) signals are applied from the amplifiers 25 via a composite line 31 to pickoff electronics 33. For each of channels 1 through 4 in this description, the pickoff electronics 33 develops a servo signal which is proportional to the displacement of the rotor with respect to the electrode pair in the associated channel. Riding on top of each servo signal is the associated mass unbalance modulation signal, or MUM signal, resulting from the rotation of the mass unbalanced rotor (FIG. 3). These composite MUM and servo signals for channels 1 through 4, respectively designated as $E_1$ through $E_4$ signals, are applied by way of composite line 35 to both a MUM signal reconstruction circuit 37 and servo suspension electronics 39.

The circuit 37 demodulates and filters the $E_1$ through $E_4$ signals to substantially remove the servo signals, and then reconstruct MUM signals $M_x$, $M_y$ and $M_z$ in three mutually orthogonal axes X, Y and Z. These reconstructed MUM signals are applied on composite line 40 to speed control electronics 41 and to the servo suspension electronics 39, and also to attitude processing, computing, and utilization circuits 42 to obtain navigation information.

A square wave signal $f_b$, which is phase-locked to a frequency equal to the rotor speed, is also applied to the speed control electronics 41. This $f_b$ signal is compared in the speed control electronics 41 with an internally generated referenced signal to generate an error signal that is indicative of rotor speed error. This error signal is then used by the speed control electronics 41 to selectively modify the reconstructed MUM signals to develop speed control signals $Sc_x$, $Sc_y$, and $S_z$, which operate together as an accelerating or decelerating force to subsequently control the rotor speed. These speed control signals are applied via composite line 43 to the servo suspension electronics 39.

The composite MUM and servo signals $E_1$-$E_4$ from the pickoff electronics 33 are internally transformed in the servo suspension electronics into composite servo and MUM signals $S_x + M_x$, $S_y + M_y$, and $S_z + M_z$ (to be explained later) in the three mutually orthogonal axes X, Y and Z. This enables the reconstructed MUM signals $M_x$, $M_y$, $M_z$ to be subtracted from the transformed signals $S_x + M_x$, $S_y + M_y$, and $S_z + M_z$ to internally produce difference signals that contain rotor displacement information without MUM signals. These difference signals are then internally fed through servo stabilization networks (FIG. 11) which now do not require notch filters and summed with the speed control signals $Sc_x$, $Sc_y$ and $Sc_z$. The summed signals in the axes X, Y and Z are internally transformed into force signals $\pm Fs_1$ through $\pm Fs_4$ in the original four axes of suspension. These force signals are applied by way of composite line 45 to the plate charge amplifiers 25 to control the charges applied to the plate electrodes, and hence the force exerted on the rotor in the electrostatic gyroscope 29. By this means, the rotor is electrostatically suspended among the pairs of electrodes.

A more detailed explanation of the various components of the system will now be given by referring to the remaining Figures.

Figure 4:
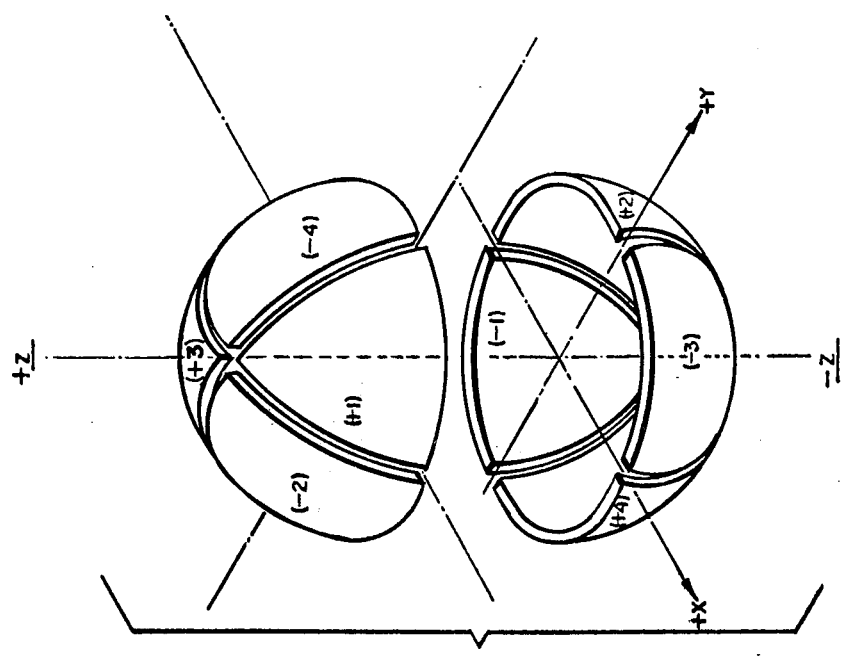
FIG. 4 illustrates in an exploded view the positioning and shape of the levitating electrodes used in the electrostatic gyroscope of FIG. 2.

FIGS. 3 and 4 illustrate in more detail the electrostatic gyroscope 29 of FIG. 2. The gyroscope 29 may be comprised of a nonconductive ceramic case 47 with a spherical interior contour and an electrically-conductive, spherical, mass-balanced rotor or ball 49 which may be spun as a rotor to act as a gyroscope. Within the case 47 is a spherical cavity 51 lined with eight octantal plate electrodes, shown in FIG. 4 as seen from the outside, which are denoted for convenience in analysis as +1, −1, +2, −2, +3, −3, +4 and −4. Each pair, e.g., +1 and −1, are diametrically opposed. The electrode surfaces may be thought of as a projection upon a sphere of the eight faces of a regular octahedron. The axes of the electrodes set are then taken as X, Y and Z in FIG. 4. The X and Z axes define the plane along which a section is taken for FIG. 3. A vacuum exists within the spherical cavity 51.

Each pair of electrodes, e.g., +1 and −1, are coupled into the rest of the system (to be described) such that the departure of the rotor 49 from the center of the spherical cavity 51, which, for example, decreases the gap between the rotor 49 and the electrode +1 and increases the gap between the rotor 49 and the electrode −1, results in a voltage decrease and increase respectively, to center the rotor 49.

The pickoff electronics 33 will now be more fully explained by referring to FIG. 5. As shown in FIG. 5, the pickoff electronics 33 is comprised of four identical signal processors 53-56 in channels 1-4, respectively. The channel signal processors 53-56 respectively operate in conjunction with associated electrode pairs I, II, III and IV, which are respectively comprised of the following pairs of electrodes: +1, −1; +2, −2; +3, −3; and +4, −4. Each of the channel signal processors 53-56 operate similar to the others and includes an input difference amplifier 61, a pair of sample and hold circuits 63 and 65 and an output difference circuit 67. As a result, only the operation of the channel 1 signal processor 53 will be explained in detail, since the processors 54-56 operate in a similar manner with respect to their associated electrode pairs.

The electrode pickoff signals for electrode pair I, which are proportional to the electrode voltages on electrodes +1 and −1, are applied to the difference amplifier 61 in the channel 1 signal processor 53. The difference amplifier 61 in the processor 53 substantially senses the difference voltage between the pair I electrodes +1 and −1 and feeds this difference voltage to the channel 1 sample and hold circuits 63 and 65. An $r_1$ signal (developed in the circuit of FIG. 8 and illustrated in FIG. 10—to be described later) allows the circuit 63 to periodically sample and store the voltage difference between the pickoff signals from the pair I electrodes during a first time period (during counts 4 and 5 in FIG. 10). In a like manner, an $r_2$ signal (also developed in the circuit of FIG. 8 and illustrated in FIG. 10) allows the circuit 65 to periodically sample and store the voltage difference between the pickoff signals from the pair I electrodes during a second time period (during counts 14 and 15 in FIG. 10). In this particular implementation of the pickoff electronics 33, the pair of staggered gated sample and hold circuits 63 and 65 is used to sample the voltage difference at the output of the amplifier 61 because the polarity of the voltage difference during the first time period is opposite from the polarity of the voltage difference during the second time period. The first and second time periods will be discussed later in more detail in relation to FIGS. 8, 9, 10 and 13. It should, however, be realized that any other suitable implementation of the pickoff electronics 33 (as well as the other circuits of FIG. 2) could be utilized in conformance with the teachings of this invention.

The outputs of the pair of sample and hold circuits 63 and 65 are applied to the difference amplifier 67 to enable the difference amplifier 67 to develop a channel 1 output difference voltage $E_1$, which contains a MUM signal component ($A_1 \sin\omega t + B_1 \cos\omega t$), and a servo signal component ($S_1$) which is proportional to the displacement of the rotor 49 from a central position between the +1 and −1 electrodes.

In a like manner, the signal processors 54-56 respectively develop output difference voltages $E_2$, $E_3$ and $E_4$, each difference voltage containing a servo signal indicative of the relative position of the rotor 49 between the electrodes in an associated electrode pair, as well as an associated MUM signal. The values of these $E_1$-$E_4$ voltages are given by the following equations:

$$E_1 = A_1 \sin\omega t + B_1 \cos\omega t + S_1$$

$$E_2 = A_2 \sin\omega t + B_2 \cos\omega t + S_2$$

$$E_3 = A_3 \sin\omega t + B_3 \cos\omega t + S_3$$

$$E_4 = A_4 \sin\omega t + B_4 \cos\omega t + S_4$$

where:

$\omega t$ = the rotational speed of the rotor 49 in radians per second, $\sin\omega t$ and $\cos\omega t$ represent the quadrature components of the MUM signals, $A_1$–$A_4$ and $B_1$–$B_4$ represent the amplitudes of the quadrature components of the MUM signals in the voltages $E_1$–$E_4$, and $S_1$–$S_4$ are the servo signals which represent the voltages resulting from a linear displacement of the rotor along the electrode axes 1–4.

Figure 6:
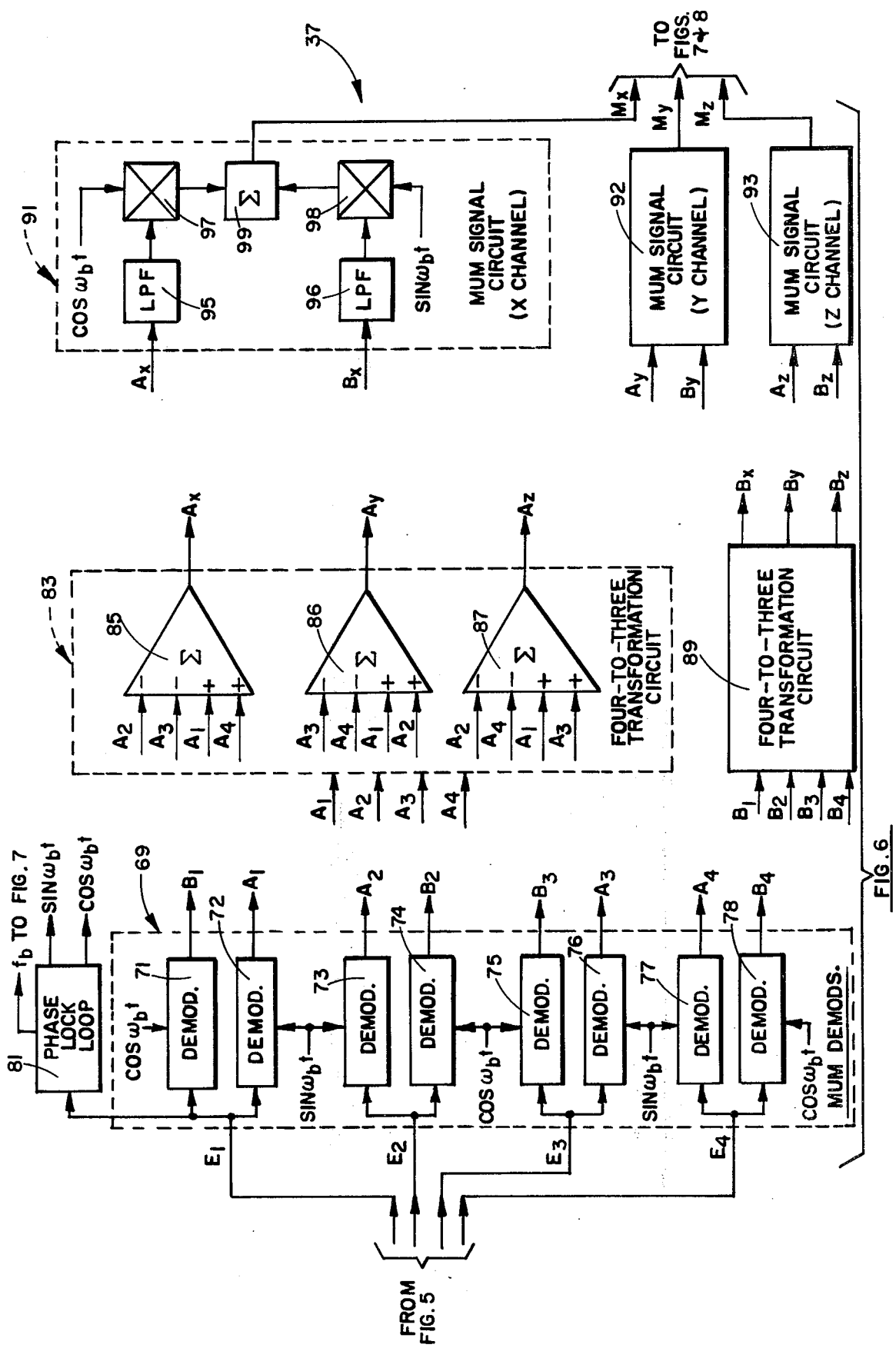
FIG. 6 is a block diagram of the MUM signal reconstruction circuit of FIG. 2.

The $E_1$–$E_4$ voltages from the pickoff electronics 33 are applied to a plurality of MUM demodulators 69 in the MUM signal reconstruction circuit 37 illustrated in FIG. 6. More specifically, the $E_1$–$E_4$ voltages are respectively applied to pairs of quadrature demodulators 71, 72, 73, 74; 75, 76; and 77, 78. The $E_1$ voltage is also utilized to phase lock a phase lock loop 81 to enable the loop 81 to develop a square wave signal $f_b$ and quadrature sine wave signals $\sin\omega_b t$ and $\cos\omega_b t$, each at the frequency corresponding to the rotational speed of the rotor or ball 49. The $f_b$ signal will be discussed later in relation to FIG. 7. The $\sin\omega_b t$ signal is applied to the demodulators 72, 73, 76 and 77, while the $\cos\omega_b t$ signal is applied to the demodulators 71, 74, 75 and 78. This enables the demodulators 71–78 to eliminate the servo signals and just develop Fourier coefficients of the MUM signals in Four Space (four axes). The demodulators 72, 73, 76, 77, 71, 74, 75 and 78 respectively develop time-varying, D.C. signals $A_1$, $A_2$, $A_3$, $A_4$, $B_1$, $B_2$, $B_3$ and $B_4$ at their outputs. The $A_1$ and $B_1$ signals are the in-phase and quadrature components of the MUM signal in the axis of suspension (+1 and −1 electrodes) from which the $E_1$ voltage was derived. Similarly, each of the pairs of the signals $A_2$ and $B_2$, $A_3$ and $B_3$, and $A_4$ and $B_4$ contain the in-phase and quadrature components of the MUM signal in the associated axis of suspension. These $A_1$–$A_4$ and $B_1$–$B_4$ signals are attitude information signals of the rotor 49 in Four Space with respect to the electrode pairs I–IV.

The in-phase $A_1$–$A_4$ signals are applied to a four-to-three (4:3) transformation circuit 83, comprised of summation amplifiers 85, 86 and 87, to enable the circuit 83 to change the Four Space $eA_1$–$A_4$ signals into Three Space $A_x$, $A_y$ and $A_z$ signals along orthogonal axes X, Y and Z, respectively. In relation to the summation amplifier 85, the $A_2$ and $A_3$ signals are applied to inverting inputs, the $A_1$ and $A_4$ signals are applied to non-inverting inputs, to cause the amplifier 85 to develop the $A_x$ signal. In regard to the amplifier 86, the $A_3$ and $A_4$ signals are applied to inverting inputs, while the $A_1$ and $A_2$ signals are applied to non-inverting inputs so that the amplifier 86 can develop the $A_y$ signal. Finally, in relation to the amplifier 87, the $A_2$ and $A_4$ signals are applied to inverting inputs and the $A_1$ and $A_3$ signals are applied to non-inverting inputs to enable the amplifier 87 to generate the $A_z$ signal.

The quadrature $B_1$–$B_4$ signals are applied to a four-to-three transformation circuit 89, similar in structure and operation to the transformation circuit 83, to enable the circuit 89 to change the Four Space $B_1$-$B_4$ signals into Three Space $B_x$, $B_y$ and $B_z$ signals along the orthogonal axes X, Y and Z, respectively. In this manner the transformation circuits 83 and 89 cooperate to convert the in-phase and quadrature components of the Four Space Fourier coefficients $A_1$, $B_1$; $A_2$, $B_2$; $A_3$, $B_3$; and $A_4$, $B_4$ of the MUM signals into in-phase and quadrature components of the Three Space Fourier coefficients $A_x$, $B_x$; $A_y$, $B_y$; and $A_z$, $B_z$ of the MUM signals, in preparation for the reconstruction of the sinewave MUM signals in Three-Space.

To accomplish the reconstruction of the sinewave MUM signals in Three-Space, the groups of in-phase and quadrature components of the MUM signals in the three axes X, Y and Z, namely, $A_x$ and $B_x$, $A_y$ and $B_y$ and $A_z$ and $B_z$ are respectively applied to MUM signal circuits 91, 92 and 93 in the associated X, Y and Z channels, respectively. Each of the MUM signal circuits 91–93 is similar in construction and operation to the others. As a result, only the circuit 91 will be discussed in detail.

The MUM signal circuit 91 is basically a quadrature modulator circuit. The $A_x$ and $B_x$ signals, which are time-varying D.C. signals, are respectively applied through low-pass filters 95 and 96 to multipliers 97 and 98, respectively. It should be noted that quasi-square wave modulators can be used at the outputs of the filters 95 and 96 instead of the multipliers 97 and 98. The quadrature sinewave signals, $\sin\omega_b t$ and $\cos\omega_b t$, from the phase lock loop 81 are applied as modulating signals to the multipliers 98 and 97, respectively. It should be recalled that the signals $\sin\omega_b t$ and $\cos\omega_b t$ are phase-locked to the rotor spin frequency. The modulated output signals from the multipliers 97 and 98 are summed in a combining circuit 99 to develop a reconstructed sinewave MUM signal $M_x$ for the X axis.

In a like manner, the MUM signal circuits 92 and 93 respectively develop reconstructed sinewave MUM signals $M_y$ and $M_z$ for the Y and Z axes, respectively. It is necessary to develop the Three-Space reconstructed MUM signals, $M_x$, $M_y$ and $M_z$, as sinewaves in order to develop signals which are synchronous with, but out of phase with, the pendulosity vector. By this means, either an accelerating or decelerating torque can be developed and applied to the rotor 49 for the proper speed control of the rotor. The utilization of the reconstructed MUM signals $M_x$, $M_y$ and $M_z$ in the development of the speed control signals $Sc_x$, $Sc_y$ and $Sc_z$ will now be discussed by referring to FIG. 7.

Figure 7:
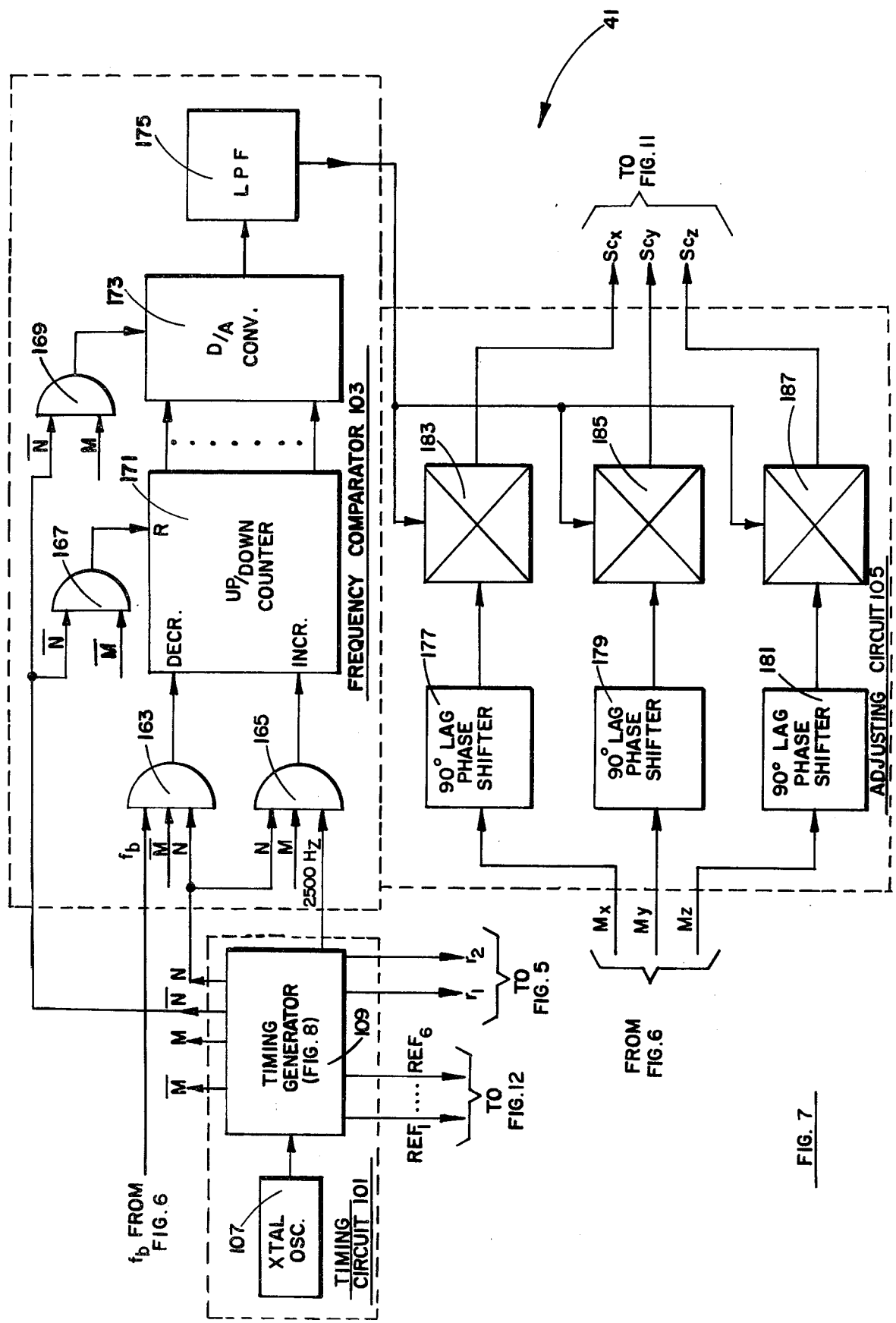
FIG. 7 is a block diagram of the speed control electronics of FIG. 2.

FIG. 7 discloses the speed control electronics 41 for generating the above-noted speed control signals. The speed control electronics 41 is comprised of a timing circuit 101, a frequency comparator 103 and an adjusting circuit 105.

Figure 8:
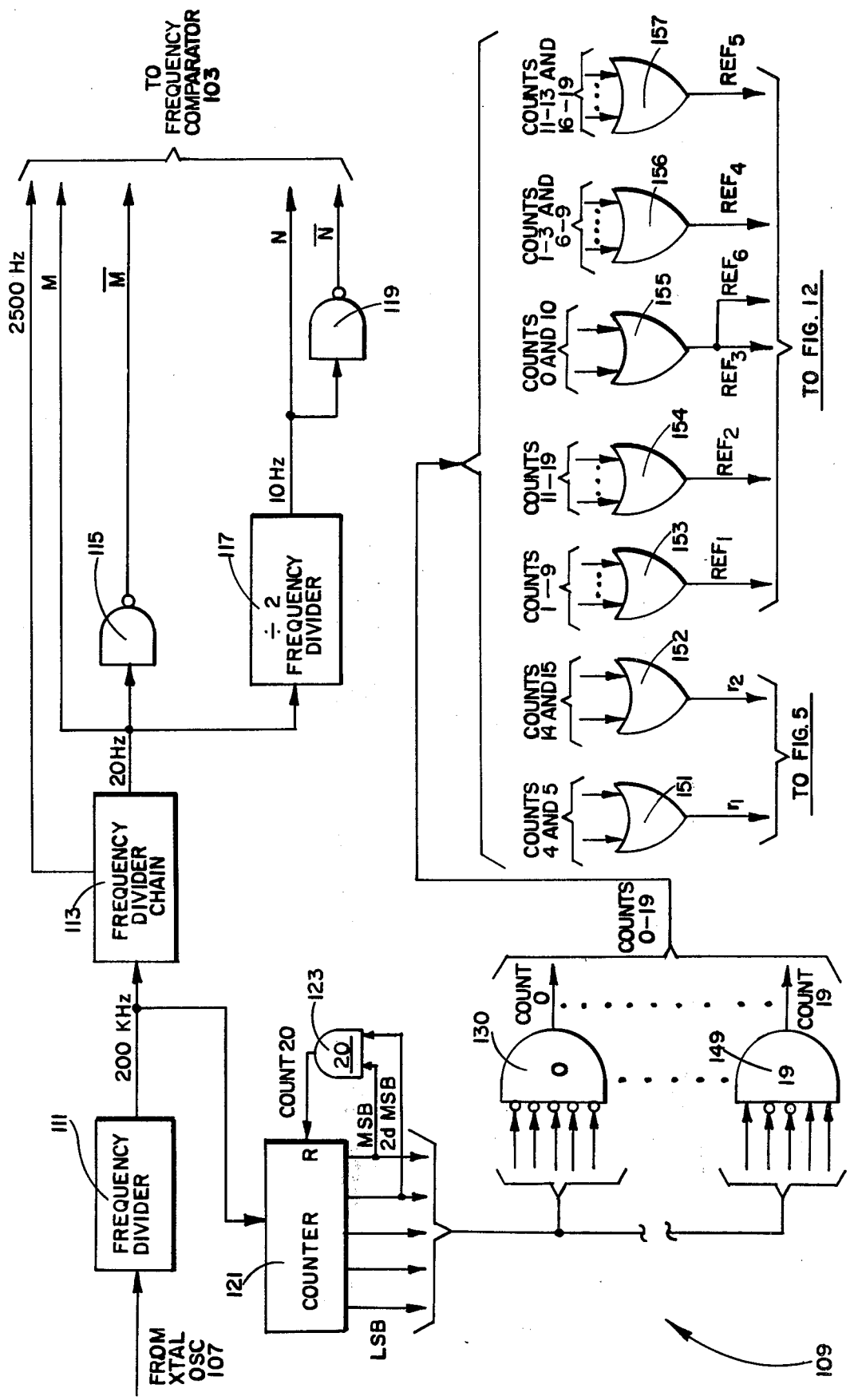
FIG. 8 is a block diagram of the timing generator of FIG. 7.
Figure 9:
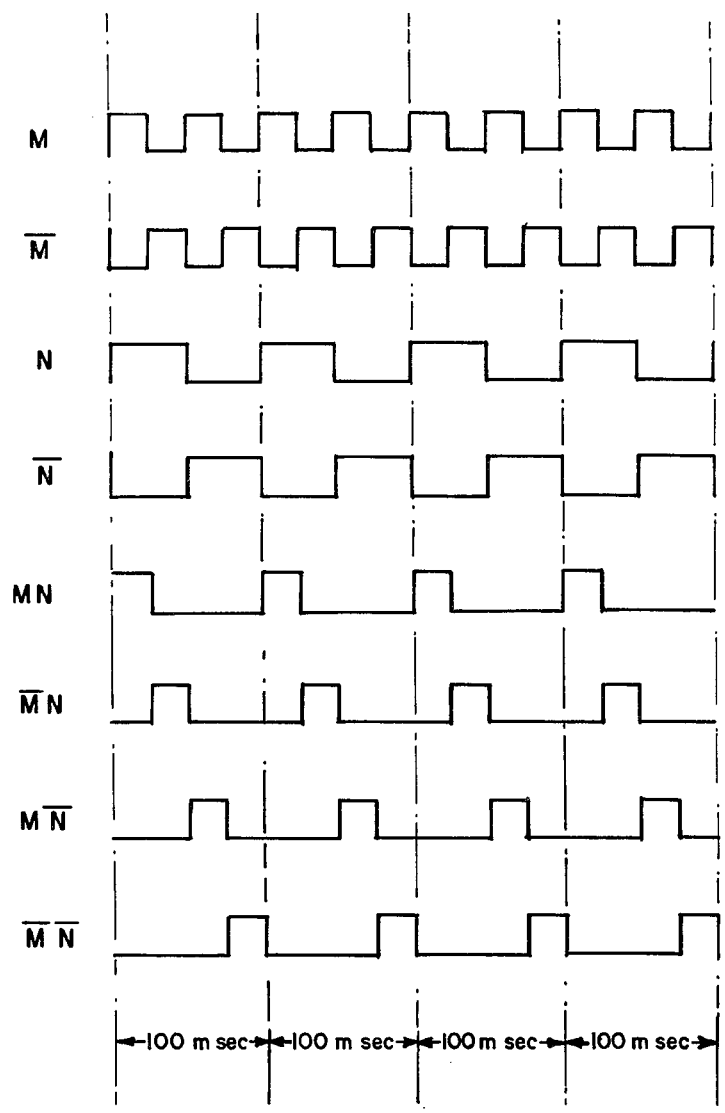
FIGS. 9 and 10 illustrate waveforms useful in explaining the operation of the circuits of FIGS. 7 and 8.
Figure 10:
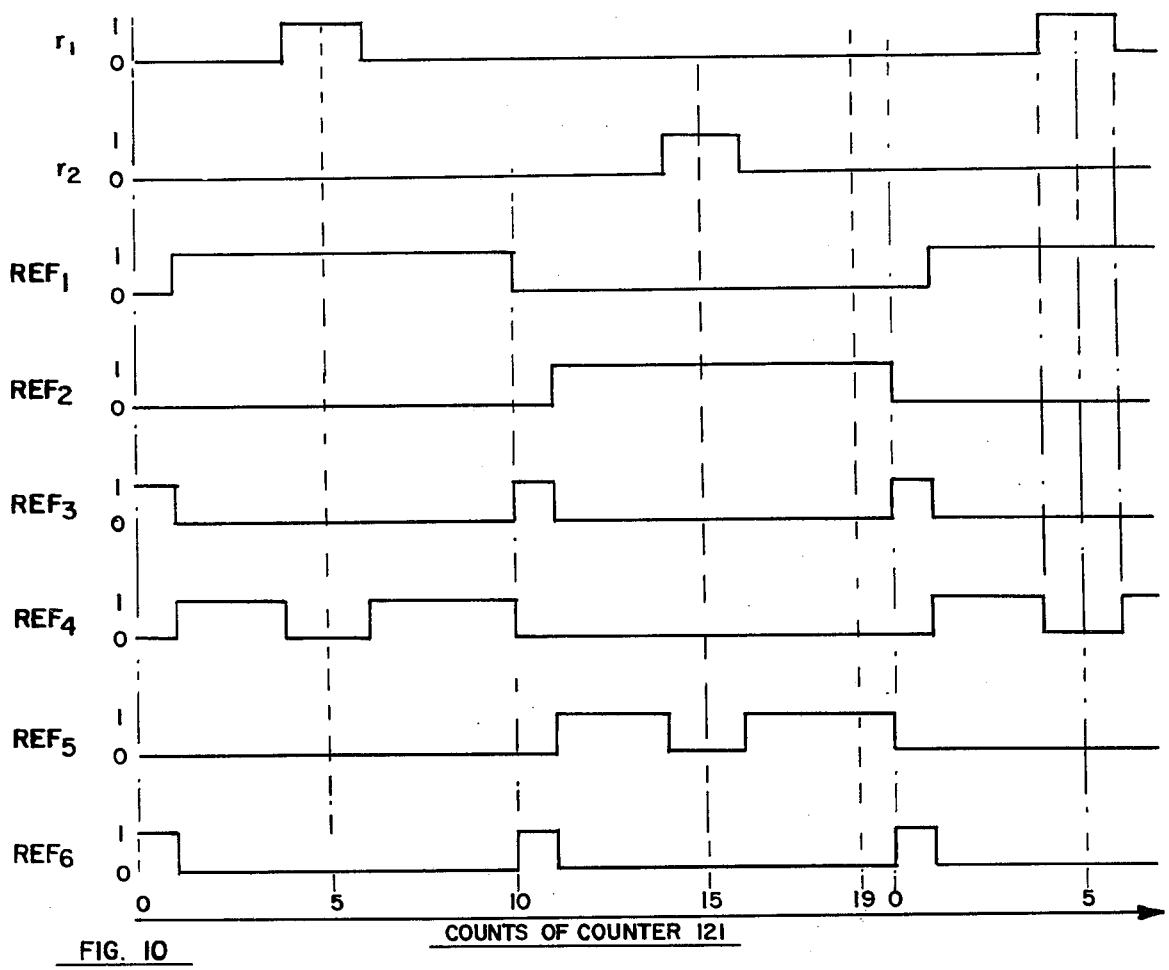

The timing circuit 101 of FIG. 7 can best be understood by also referring to FIGS. 8, 9 and 10. A crystal oscillator 107 supplies a signal at a suitable frequency of, for example, one megahertz (1 MHz) to a timing generator 109, which is illustrated in detail in FIG. 8. More particularly, the 1 MHz signal from the crystal oscillator 107 is divided by frequency divider 111 down to a 200 kilohertz (KHz) signal before being applied to a frequency divider chain 113. The frequency divider chain 113 develops a 2500 Hz reference signal, and a 20 Hz signal M. The signal M is logically inverted by NAND gate 115 to develop a signal $\overline{M}$. The 20 Hz signal M is also applied to a $\div 2$ frequency divider 117 to develop a 10 Hz signal N. This signal $\overline{N}$ is, in turn, logically inverted by NAND gate 119 to develop a signal $\overline{N}$. The M, $\overline{M}$, N, $\overline{N}$ and 2500 Hz signals are all square wave signals which are utilized by the frequency comparator 103 to develop a signal to control the operation of the adjusting circuit 105. Waveforms of these M, $\overline{M}$, N and $\overline{N}$ signals are illustrated in FIG. 9. Also shown in FIG. 9 are waveforms of timing periods MN, $\overline{M}$N, M$\overline{N}$, and $\overline{MN}$, during which binary "1" state signals are sequentially developed from the indicated inputs by AND gates (to be discussed in relation to FIG. 7). For the selected 10 Hz signal N, each of the above "1" state timing periods has a duration of 25 milliseconds.

The 200 KHz signal from the frequency divider 111 is also applied to a five-bit binary counter 121. The most significant bit (MSB) and second most significant bit (2dMSB) from the output of the counter 121 are applied as inputs to an AND gate 123. As soon as the counter 121 reaches a count of 20, the AND gate 123 develops a "1" state output which resets the counter 121 to a digital count of 0 (00000). This causes all of the outputs (MSB, 2dMSB . . . LSB) of the counter 121 to go to or remain in a "0" state condition. The counter 121 remains in this 0-count condition until the next cycle from the 200 KHz is counted causing the counter output to change to a 1-count (00001). In this manner, the counter 121 develops outputs representative of counts 0 to 19, with each output count lasting for a duration of 5 microseconds. The outputs of the counter 121 are applied to each of AND gates 130–149. The inputs to the AND gates 130–149 are selectively inverted in a preselected manner to enable the AND gates 130–149 to selectively develop output signal counts 0–19, which correspond to the output counts of the counter 121. For example, all of the inputs from the counter 121 to the AND gate 130 are inverted to enable only the AND gate 130 to develop a "1" state output when the counter 121 is holding a digital count of 0 (00000). Likewise, all of the inputs to the AND gate 149, except the second and third most significant bits from the counter 121, are inverted to enable only the AND gate 149 to develop a "1" state output when the counter 121 is holding a digital count of 19 (10011).

The signal counts 0–19 from the AND gates 130–149 are selectively applied to a plurality of OR gates 151–157 to enable these OR gates to respectively develop $r_1$, $r_2$, $REF_1$, $REF_2$, $REF_3$ and $REF_6$, $REF_4$ and $REF_5$ signals, which are illustrated in FIG. 10, during the indicated counts of the counter 121. As described previously, the $r_1$ signal is developed (by the OR gate 151) during the forth and fifth counts of the counter 121, while the $r_2$ signal is developed (by the OR gate 152) during the fourteenth and fifteenth counts of the counter 121. Since each count lasts for a duration of 5 microseconds, the first and second time periods, during which the $r_1$ and $r_2$ signals are respectively generated (described in relation to FIG. 5), each have a time duration of ten microseconds.

As further illustrated in FIGS. 8 and 10, the $REF_1$ signal is developed during counts 1–9; the $REF_2$ signal is developed during counts 11–19, the $REF_3$ and $REF_6$ signals are each developed during counts 0 and 10; the $REF_4$ signal is developed during counts 1–3 and 6–9; and the $REF_5$ signal is developed during counts 11–13 and 16–19. These $REF_1$–$REF_6$ signals are utilized as timing signals in the plate charge amplifiers of FIG. 12 (to be discussed).

Returning now to FIG. 7, the N, $\overline{N}$, M and $\overline{M}$ signals from the timing generator 109 are applied to the frequency comparator 103 as follows. The 10 Hz signal N is applied to first inputs of AND gates 163 and 165, while the signal $\overline{N}$, or negation of N, is applied to first inputs of AND gates 167 and 169. The 20 Hz signal M is applied to second inputs of the AND gates 165 and 169, and the signal $\overline{M}$, or negation of M, is applied to second inputs of the AND gates 163 and 167.

In operation, the AND gate 165 allows cycles of the 2500 Hz reference signal to increment the count of a binary up-down counter 171 accordingly, whenever the M and N signals are both in logical "1" states, as illustrated in the waveform MN in FIG. 9. Similarly, the AND gate 163 allows cycles of the rotor speed signal $f_b$ (from the phase lock loop 81 in FIG. 6) to decrement the count of the up-down counter 171 accordingly, whenever the $\overline{M}$ and N signals are both in logical "1" states, as illustrated in the waveform $\overline{M}$N in FIG. 9. It can therefore be seen that the counter 171 is alternately incremented by the 2500 Hz signal and decremented by the $f_b$ signal during the respective MN and $\overline{M}$N time periods, which both occur during the positive alternation of each N signal. It should also be noted that the AND gates 167 and 169 are both disabled by the "0" state $\overline{N}$ signal during the MN and $\overline{M}$nn time periods.

The digital output count of the counter 171, which represents the error in frequency between the actual rotor spin frequency $f_b$ and the 2500 Hz reference signal, is applied to a digital-to-analog (D/A) converter 173. However, the D/A converter 173 is prevented from changing its previous analog error signal output during the Mn and $\overline{M}$n time periods (FIG. 9) by a "0" state signal from the AND gate 169.

The up-down counter 171 may be any suitable up-down counter for developing a two's complement output of the binary number system. The two's complement binary output contains a sign bit and a preselected number of amplitude bits. The D/A converter 173 may be any suitable D/A converter which develops a negative or positive polarity analog output signal in response to a two's complement binary input signal from the counter 171. If, for example, the counter 171 developed a 3-bit two's complement output, then the corresponding binary input and analog output signals of the A/D converter 173 would be as follows:

| Binary Inputs | Analog Outputs |
| --- | --- |
| 011 | +3 |
| 010 | +2 |
| 001 | +1 |
| 000 | 0 |
| 111 | −1 |
| 110 | −2 |
| 101 | −3 |
| 100 | −4 |

In the above example, the first bit in each binary input is the sign bit, with a "0" state sign bit representing a positive polarity and a "1" state sign bit representing a negative polarity. The remaining bits in each binary input represent the absolute amplitude of the input signal. To convert a positive amplitude input into a negative amplitude input, all of the bits in the binary input are complemented and a binary "1" is added to the least significant bit in the complemented binary number. The number of amplitude bits determine the accuracy and resolution of speed control in the system.

During the negative alternation of each N signal, the AND gates 163 and 165 are disabled by the "0" state N signal, thereby preventing the counter 171 from changing its output digital count, and the AND gates 167 and 169 are enabled by the "1" state N signal to act as repeaters of the signals at their inputs, respectively. The MN̄ and M̄N time periods of FIG. 9 sequentially occur during the negative alternation of each N signal, since the M and M̄ signals are respectively in binary "1" states during the first and second halves of the negative alternation of the N signal. As a result, during the MN̄ time period the AND gate 167 is kept in a disabled condition by the "0" state M̄ signal, while the AND gate 169 is enabled by the "1" state M signal.

The D/A converter 173 is only enabled by the "1" state output of the AND gate 169 during the Mn time period to convert the digital signal from the counter 171 to a corresponding analog signal. This analog signal is a slowly varying bipolar, D.C. signal that is proportional to the rotor spin frequency error.

During the subsequent M̄N time period, the AND gate 169 is disabled by the "0" state M signal to prevent the D/A converter 173 from changing its output. At the same time (M̄N period), the AND gate 167 is enabled by the "1" state M̄ and N signals to reset the counter 171 to an output digital count of zero. The output of the counter 171 remains at a zero count until the subsequent "1" state N signal is applied to the AND gates 163 and 165, at which time the cycle of MN, M̄N, MN̄ and M̄N time periods starts repeating in the manner previously discussed.

The analog signal from the D/A converter 173 is filtered by a suitable low pass filter 175 to develop the speed error control signal which controls the operation of the adjusting circuit 105. As indicated before, this speed error control signal is a bipolar variable D.C. signal which is proportional to the speed error of the rotor 49. It will be recalled that the frequency of the $f_b$ signal is proportional to the speed of the rotor about its spin axis. Therefore, if the rotor 49 spin frequency is low, the frequency of the $f_b$ signal will be lower than that of the 2500 Hz reference signal. Under this condition, the speed error control signal from the filter 175 will be a negative voltage, whose amplitude will be proportional to the frequency difference between the $f_b$ and 2500 Hz signals. Likewise, when the frequency of $f_b$ is higher than 2500 Hz, the speed error control signal will be a positive voltage, whose amplitude will be proportional to the frequency difference between the $f_b$ and 2500 Hz signals.

In the operation of the adjusting circuit 105, the reconstructed sinewave MUM signals $M_x$, $M_y$ and $M_z$ are respectively delayed in phase 90° by 90° lag phase shifters 177, 179, and 181. It is important to note that if the reconstructed MUM signals were not phase shifted, but remained in phase, there would be no accelerating force exerted on the rotor 49. To get the maximum accelerating force applied to the rotor 49, it is necessary to phase shift the reconstructed MUM signals $M_x$, $M_y$ and $M_z$ by 90° by either advancing or retarding (delaying) their phases by 90°. If the $M_x$, $M_y$ and $M_z$ signals are advanced in phase by 90°, the high frequency harmonics in these signals would be amplified more than the low frequency components therein. This would accentuate the noise in the MUM signals. On the other hand, if these MUM signals were each retarded in phase by 90°, the high frequency components would be attenuated more than the low frequency components therein. This would consequently result in a less noisy system.

The 90° phase shifted outputs of the phase shifters 177, 179 and 181 are each multiplied in multipliers 183, 185 and 187 by the speed error control signal from the low pass filter 175 to develop, as products, the speed control signals $Sc_x$, $Sc_y$ and $Sc_z$. Each of these speed control signals is a sinewave whose amplitude and sign are changed by the speed error control signal, with the amplitude being proportional to the error in speed in the associated one of the axes X, Y and Z. Different amplitudes of speed control signals are generated because it is necessary to produce a resultant force in a plane exactly orthogonal to the spin axis of the rotor 49 in order to prevent the production of any drift rate torques. This minimizes any drift in the rotor spin axis and hence minimizes any resultant error in the inertial system.

These $Sc_x$, $Sc_y$ and $Sc_z$ signals will cause either a decelerating force or an accelerating force to be developed, depending on the polarity of the speed error control signal. For example, with a low rotor speed, the resultant negative speed error control signal from the filter 175 will cause the $Sc_x$, $Sc_y$ and $Sc_z$ signals from the multipliers 183, 185 and 187 to become accelerating forces which will ultimately act to increase the speed of the rotor 49 to a desired speed, and vice-versa. Also, a more negative speed error control signal will cause the multipliers 183, 185 and 187 to develop a larger accelerating force, and vice-versa.

Figure 11:
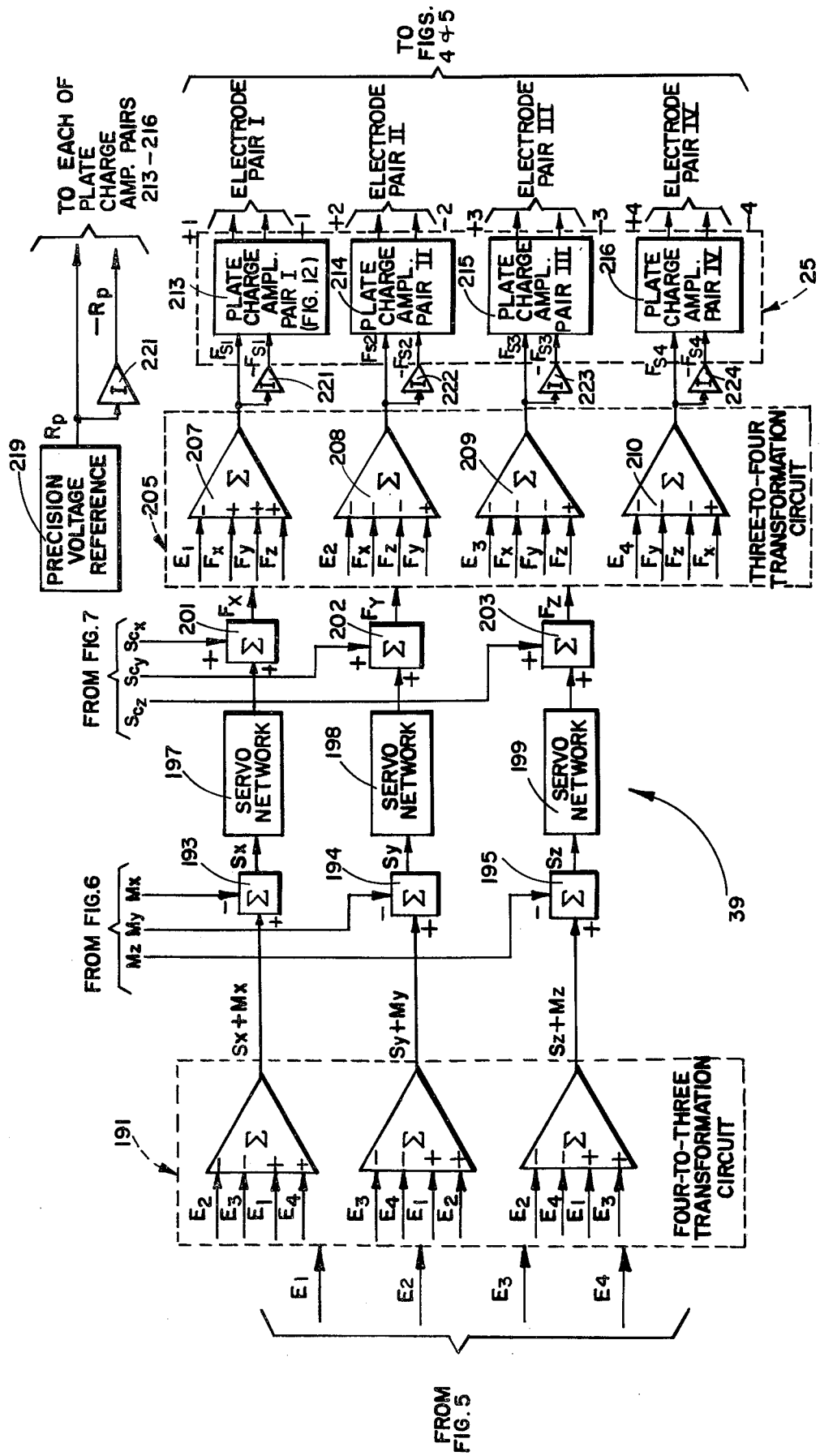
FIG. 11 is a block diagram of the servo suspension electronics and plate charge amplifiers of FIG. 2.

Referring now to the servo suspension electronics and plate charge amplifiers illustrated in FIG. 11, the composite MUM and servo signals $E_1$–$E_4$ from the pickoff electronics 33 are applied to a four-to-three transformation circuit 191, similar in structure and operation to the circuit 83 (FIG. 6). The circuit 191 changes the Four Space $E_1$–$E_4$ signals into Three Space $S_x + M_x$, $S_y + M_y$, and $S_z + M_z$ signals along the orthogonal axes X, Y and Z. In these Three Space signals, the "S" components represent the servo signals and the "M" components represent the MUM components.

The reconstructed MUM signals $M_x$, $M_y$ and $M_z$ from the MUM signal reconstruction circuit 37 (FIG. 6) are respectively subtracted from the $S_x + M_x$, $S_y + M_y$, and $S_z + M_z$ signals in combining or subtraction circuits 193–195, respectively, to develop the servo signals $S_x$, $S_y$ and $S_z$, which only contain ball displacement information.

The servo signals $S_x$, $S_y$ and $S_z$ are then fed to servo networks 197, 198 and 199, respectively. Each of the servo networks 197, 198 and 199 operates to provide servo compensation for its associated one of the servo signals $S_x$, $S_y$ and $S_z$ in order to stabilize the operation of the servo suspension electronics, and hence the system, according to well known servo feedback methods.

Figure 12:
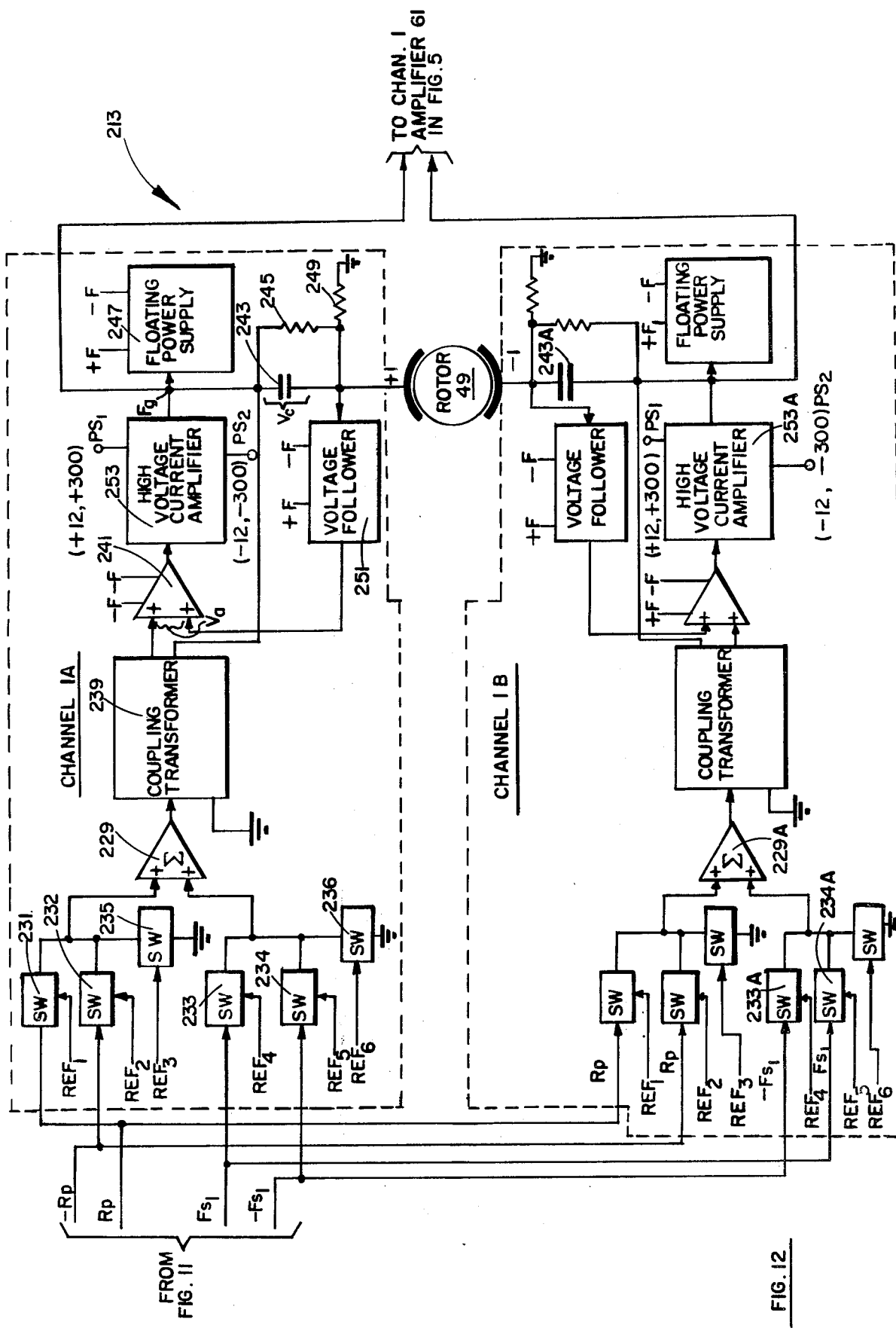
FIG. 12 is a detailed schematic diagram of the pair I plate charge amplifiers illustrated in FIG. 11.

The relatively small speed control signals $Sc_x$, $Sc_y$ and $Sc_z$ from the speed control electronics 41 (FIG. 7) are respectively added to the outputs of the servo networks 197, 198, and 199 in combining or summing circuits 201, 202 and 203, respectively, to develop force signals $F_x$, $F_y$ and $F_z$. Each of these force signals $F_x$, $F_y$ and $F_z$ is a composite of a servo signal and a speed control signal in the associated one of the axes X, Y, Z. However, in this implementation, these Three-Space force signals must be transformed into Four-Space signals before they can be utilized by the plate charge amplifiers 25 (FIG. 12). To accomplish this transformation, the $F_x$, $F_y$, $F_z$ and $E_1$–$E_4$ signals are applied to a three-to-four transformation circuit 205 to develop Four-Space force signals $Fs_1$ through $Fs_4$, which are positive-polarity D.C. voltages.

The three-to-four transformation circuit 205 is comprised of summation amplifiers 207, 208, 209 and 210. In relation to the summation amplifier 207, the $E_1$ signal is applied to an inverting input, while the $F_x$, $F_y$ and $F_z$ signals are applied to non-inverting inputs, to cause the amplifier to develop the $Fs_1$ signal. In regard to the amplifier 208, the $E_2$, $F_x$ and $F_z$ signals are applied to inverting inputs, while the $F_y$ signal is applied to a non-inverting input, to enable the amplifier 208 to develop the $Fs_2$ signal. In the operation of the amplifier 209, the $E_3$, $F_x$ and $F_y$ signals are applied to inverting inputs, while the $F_z$ signal is applied to a non-inverting input, to enable the amplifier to develop the $Fs_3$ signal. Finally, in relation to the amplifier 210, the $E_4$, $F_y$ and $F_z$ signals are applied to inverting inputs, while the $F_x$ signal is applied to a non-inverting input, to allow the amplifier 210 to develop the $Fs_4$ signal.

The positive polarity $Fs_1$ through $Fs_4$ signals are respectively applied directly to pairs I–IV of plate charge amplifiers 213–216 and are also respectively applied through inverters 221–224 to feed negative polarity signals $-Fs_1$ through $-Fs_4$ to the amplifier pairs 213–216. Also applied to each of the plate charge amplifier pairs 213–216 is a constant reference voltage Rp developed by a precision voltage reference circuit 219, as well as the inversion of the Rp signal ($-Rp$) developed by an inverter 221. In response to these Rp, $-Rp$ and $\pm Fs_1$ through $\pm Fs_4$ signals, the plate charge amplifier pairs 213–216 respectively develop the electrode voltages for application to the +1, −1; +2, −2; +3, −3; and +4, −4 pairs of electrodes in order to electrostatically suspend the rotor 49 thereamong, as discussed previously. In addition, as will be more fully described in FIG. 12, voltages proportional to these electrode voltages are applied as electorde pickoff signals to the pickoff electronics 33 (FIG.5). Each of these plate charge amplifier pairs 213–216 is substantially identical in structure and operation to the others. As a result, only the pair I plate charge amplifier 213 will be discussed in FIG. 12. Before FIG. 12 is discussed, a few comments on the circuitry of FIG. 11 will now be made in retrospect.

It will be recalled that the purpose of the notch filter in prior art systems was to attenuate the MUM signal to the plate charge amplifiers and to provide speed control. However, with the system of this invention, no notch filters (with their attendant disadvantages) are utilized at the inputs of the servo networks 197–199.

As described above, at the inputs of the servo networks 197–199, the MUM signals $M_x$, $M_y$ and $M_z$ were respectively subtracted in the combiners 193–195 from the other inputs thereto. This subtracting out of the MUM signals prevents the subsequent force on the rotor 49 from pushing the rotor in and tending to prevent the generation of the MUM signals. Furthermore, the removal of the MUM signals from the inputs to the servo networks 197–199 is almost total and is not affected by changes in temperature, aging of components, humidity, etc., unlike in those prior art systems which utilize notch filters. A more complete removal of the MUM signals from the signals at the inputs of the servo network 197–199 also increases the shock capability of the ESG system to gravitational (G) forces.

In the prior art systems, speed control was performed by the notch filters. However, a more accurate speed control is needed than that provided by ordinary notch filters. This is especially true in gimballed ESG systems. In the system of this invention, as previously described, the circuitry of FIG. 7 provided the speed control signals $Sc_x$, $Sc_y$ and $Sc_z$ to FIG. 11. Through this implementation a more accurate speed control of the rotor 49 can be provided than that which is provided by prior art systems utilizing ordinary notch filters, in either gimballed or strapdown ESG system applications. An accurate ESG system substantially maintains the spin axis of the rotor in the same position with respect to the case of the rotor, and, therefore, has a relatively low drift rate. In a prior art system, as the case that houses the rotor is moved with respect to the rotor spin axis, the notch filters in the X, Y and Z axes are not better than 2 to 3 Hz typically, and perhaps even 5 or 6 Hz. In the system so far presented above, just about any desired resolution can be achieved, depending upon how precisely the frequency comparator 103 and timing circuit 101 of FIG. 7 are designed. For example, if the counter 171 (FIG. 7) were a 10-bit binary counter and the frequency of the N signal were decreased sufficiently (FIG. 8), a resolution in 1 part of 1024 parts could be obtained. In a smilar manner, higher resolutions, such as 1 part in 65,536 could be obtained with a 16-bit binary counter and suitable timing signals. A long term stability of less than ¼ Hz could therefore be obtained.

Figure 13:
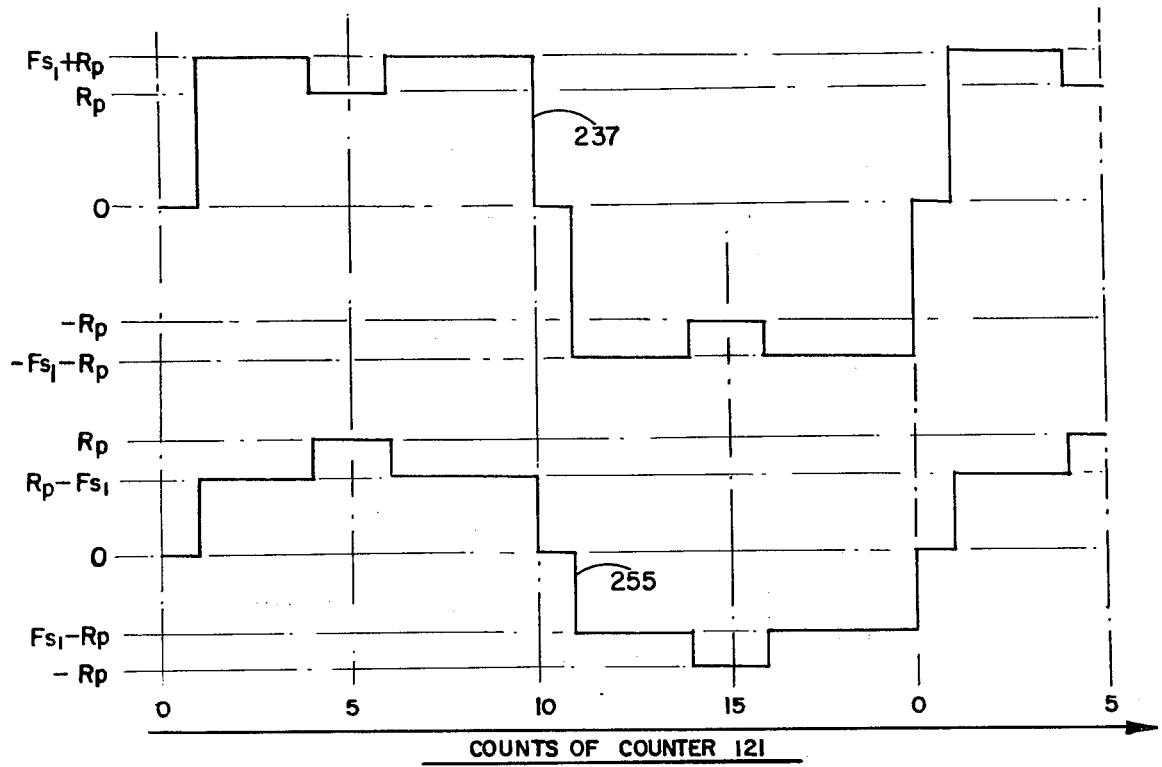
FIG. 13 illustrates waveforms useful in explaining the operation of the pair I plate charge amplifiers of FIG. 12.

Referring now to FIGS. 12 and 13, the operation of the pair I plate charge amplifier 213 (FIG. 11) will now be explained. The amplifier 213 is comprised of identical channels 1A and 1B which develop the plate charges or electrode voltages for suspending the rotor 49 between the +1 and −1 electrodes. Channel 1A supplies the electrode voltages for the +1 electrode, while channel 1B supplies the electrode voltages for the −1 electrode. Since channels 1A and 1B are substantially identical in structure and operation, only channel 1A will subsequently be discussed in detail. Furthermore, the operation of channels 1A and 1B of the amplifier 213 is equally applicable to corresponding ones of the other channels in the amplifiers 214-216 (FIG. 11).

The charge applied to channel 1A is proportional to the voltage applied to summation amplifier 229. The input voltage to the amplifier 229 is controlled by respectively applying the reference voltages Rp and $-Rp$ and the force signals $Fs_1$ and $-Fs_1$ through the switches 231, 232, 233 and 234 at preselected times. The outputs of the switches 231 and 232 are applied to a first input of the amplifier 229, while the outputs of the switches 233 and 234 are applied to a second input of the amplifier 229. Additional switches 235 and 236 are provided for respectively grounding the first and second inputs to the amplifier 229 at other preselected times. The $REF_1$ $-REF_6$ signals open and close the switches 231, 232, 235, 233, 234 and 236, respectively, at the times (counts of counter 121) indicated in FIG. 10 to cause the amplifier 229 to develop an output signal having the waveform 237 shown in FIG. 13.

The output signal of the amplifier 220 is applied to the primary winding (not shown) of a coupling transformer 239, which isolates the low level signal from the amplifier 229 from the high voltages that are applied to the +1 electrode. The secondary winding (not shown) of the transformer 239 is coupled between one input of an amplifier 241 and the junction of one end of a parallel-coupled capacitor 243 and resistor 245 combination and the input to a floating power supply 247. The other end of the parllel-coupled capacitor 243 and resistor 245 combination is coupled through a resistor 249 to ground, to the +1 electrode and also through a very high input impedance voltage follower 251 to the second input of the amplifier 241. The secondary of the coupling transformer 239 applied a voltage Va, with respect to a floating ground Fg, to the amplifier 241. In response to the voltage Va, the amplifier 241 causes a high voltage amplifier 253 to drive a current through the capacitor 243 until the voltage Vc across the capacitor 243 equals Va. Since the voltage follower 251 is a very high input impedance amplifier, substantially all of the current passing through the capacitor 243 is applied to the +1 electrode, except for a small leakage current through the resistor 249. Thus, the amplifier 241 serves to control the charge or voltage applied to the +1 electrode, since the charge on that electrode is equal to the charge on the capacitor 243.

When the rotor 49 is centered, the time constant of the capacitor 243 and resistor 245 is identical to the time constant of the resistor 249 and the capacitance between the +1 electrode and rotor 49. For this condition, the leakage through the resistor 249 is compensated for by the leakage through the resistor 245, giving a net leakage of zero current to the +1 electrode. Resistor 249 is utilized to prevent charge accumulation errors due to minute leakage currents which may exist. The floating power supply 247 furnishes power to the voltage follower 251 and amplifier 241. This allows the use of lower power, low voltage, high bandwidth integrated circuits. The ground reference for these devices is Fg, which follows the +1 electrode potential.

It should be noted at this time that channel 1B essentially differs from channel 1A in that the lines supplying the $Fs_1$ and $-Fs_1$ signals are interchanged in channel 1B. As a result, the $-Fs_1$ force signal is passed through its associated switch 233A during the period of the $REF_4$ signal, while the $Fs_1$ force signal is passed through its associated switch 234A during the period of the $REF_5$ signal (FIG. 10). With this change, the amplifier 229A develops the output signal having the waveform 255 shown in FIG. 13. The waveforms 237 and 255 are developed and applied to the electrodes +1 and −1, respectively, during each complete cycle between the start of each 0-count of the counter 121 and the end of the 19-count of the counter 121.

As indicated in the discussion in relation to FIG. 5, the "1" state $r_1$ and $r_2$ signals are developed during counts 4, 5 (first time period) and 14, 15 (second time period), respectively. In comparing the timing of the waveforms of FIGS. 13 and 10, it can be seen that the magnitude of the charges applied to the +1 and −1 electrodes during the times that the $r_1$ and $r_2$ signals are being generated (FIGS. 8 and 10) is always equal to the constant reference voltage $R_p$ (FIG. 11). The displacement of the rotor 49 within the cavity 51 (FIG. 3), during the times during which the $r_1$ and $r_2$ signals are being generated, can be electrically determined for the +1 and −1 electrodes by use of the following equations:

$$V_{F_{0+1}} = \frac{R_p}{c_1} + V_c + V_R \qquad (1)$$

$$V_{F_{0-1}} = \frac{R_p}{c_{-1}} + V_c + V_R \qquad (2)$$

where:

$V_{E_{0+1}}$ = voltage output of amplifier 253 in channel 1A $V_{E_{0-1}}$ = voltage output of amplifier 253A in channel 1B $R_p$ = constant reference voltage $C_1$ = capacitance between rotor 49 and the +1 electrode $C_{-1}$ = capacitance between rotor 49 and the −1 electrode $C_c$ = the capacitance of capacitor 243 (or 243A)

$V_c = (R_p/c_c)$ = the voltage across the capacitor 243 (or 243A)

$V_R$ = the instantaneous voltage at the rotor 49

The voltage output ($V_T$) from the circuit of FIG. 12 to the amplifier 61 in FIG. 5 during counts 4 and 5 or during counts 14 and 15 of the counter 121 (FIG. 8) can be determined from the equation:

$$V_T = V_{F_{0_1}} - V_{F_{0-1}} = \left(\frac{R_p}{C_1} + V_c + V_R\right) - \left(\frac{R_p}{C_{-1}} + V_c + V_R\right) = R_p\left(\frac{1}{C_1} - \frac{1}{C_{-1}}\right) \qquad (3)$$

The capacitances $C_1$ and $C_{-1}$ can be determined by the equations:

$$C_1 = \frac{\epsilon A}{h + \Delta X} \qquad (4)$$

$$C_{-1} = \frac{\epsilon A}{h - \Delta X} \qquad (5)$$

$\epsilon$ = dielectric constant of a vacuum
$A$ = area of each of electrodes +1 and −1
$h$ = nominal gap between the rotor 49 and either of the +1
and −1 electrodes when the rotor 49 is centered.
$\Delta X$ = displacement of the rotor 49 from the center of the cavity 51 along the axis 1

Upon substituting the above values of $C_1$ and $C_{-1}$ into equation (3) and simplifying, the following equation results:

$$V_T = \frac{2R_p}{\epsilon A} \cdot \Delta X \qquad (6)$$

Therefore:

$$V_T = K_1 \cdot \Delta X \qquad (7)$$

where $K_1 = 2R_p/\epsilon a$ = constant

Equation (7) shows that the output voltage from the circuit of FIG. 12 is proportional to the displacement $\Delta X$ of the rotor 49.

No charge is applied to the +1 and −1 electrodes during each of the 0 and 10 counts, as illustrated in the waveforms 237 and 255 of FIG. 13. This is to allow the high voltage power supplies which drive the high voltage current amplifiers 253 and 253A to change state. When electrode +1 has only a positive polarity of the $R_p$ signal applied thereto, the high voltage supplies have +300 VDC applied to $PS_1$ and −12 VDD applied to $PS_2$. When the electrode +1 has a negative polarity of the $R_p$ signal applied thereto, the high voltage supplies have +12 VDC applied to $PS_1$ and $-300$ VDC applied to $PS_2$. Switching the high voltage supplies in this manner reduces the sustaining voltage requirements for the transistors used in the high voltage current amplifier 253 (as well as in the amplifier 253A).

The amplitudes and polarities of the electrode pair I voltages developed during counts 4 and 5 and during counts 14 and 15 ($R_p$ and $-R_p$ voltages only), as shown in FIG. 13, are in phase with those developed for electrode pair III and are 180° out of phase with those developed for electrode pairs II and IV.

The net force exerted on the rotor 49 along an axis extending from the center of the cavity 51 through the center of electrode +1 is proportional to the amplitude of the force signal $Fs_1$. The periods in which a net force is exerted on the rotor 49 are indicated by the periods of the counts 1–3, 6–9, 11–13 and 16–19 shown in the waveforms 237 and 255 of FIG. 13. The forces produced by the +1 electrode along its central axis during the periods of these counts can be described by the following equations:

$$Fn_1 = F_1 - F_{-1} \qquad 8$$
$$F_1 = K_2(Qs_1 + Qr_p)^2 \qquad 9$$
$$F_{-1} = K_2(Qs_1 - Qr_p)^2 \qquad 10$$
$$Fn_1 = (4k_2Qr_p)Qs_1 = K_3Qs_1 \qquad 11$$

where:

$Fn_1$ = net force along the +1 electrode axis
$F_1$ = force applied by the +1 electrode
$F_{-1}$ = force applied by the $-1$ electrode
$K_2$ = constant relating charge to force
$Qr_p$ = charge related to signal $R_p$, which is a constant
$Qs_1$ = variable charge proportional to the voltage at the input of switches 233 (channel 1A) and 234A (channel 1B), which is $Fs_1$.
$K_3 = 4K_2Qr_p$ (newtons/coulomb)

Equation (11) shows that the force produced along the center axis of the +1 electrode is proportional to the signal $Fs_1$.

The invention thus provides an improved ESG system wherein, in each of the axes of suspension of the rotor 49, pickoff electronics 33 are responsive to electrode pickoff signals for developing combined MUM and servo signals from which a MUM signal reconstruction circuit 37 demodulates and reconstructs only the MUM signal. The reconstructed MUM signal is then subtracted in servo suspension electronics 39 form the combined MUM and servo signals to develop only the servo signal containing only rotor displacement information. This servo signal is then fed to a servo network which does not require a notch filter. The output of the servo network is then developed into a force signal to enable an associated pair of plate charge amplifiers to electrostatically suspend the rotor properly between an associated pair of electrodes. In addition, the reconstructed MUM signals are utilized by speed control electronics 41 to develop and add highly accurate and precise speed control signals to the stabilized servo signals at the output of the servo network to provide improved speed control without the use of any notch filter.

While the salient features have been illustrated and described in a preferred embodiment of the invention, it should be readily apparent to those skilled in the art that many changes and modifications can be made in that preferred embodiment without departing from the spirit and scope of the invention. It is therefore intended to cover all such changes and modifications of the invention that fall within the spirit and scope of the invention as set forth in the appended claims.

What is claimed is:

1. In a suspension and position indicating system for an electrostatic gyroscope of the type which incorporates a plurality of electrodes arranged in a symmetrical array around a mass unbalanced conductive ball, which ball is adapted to be spun around a spin axis and wherein a plurality of circuits supply a plurality of signals to the plurality of electrodes to control the position of the spinning ball, a system comprising:

first means responsive to a plurality of electrode pickoff signals from the plurality of circuits for developing a plurality of first signals and a plurality of reconstructed MUM signals, each of the plurality of first signals containing a combination of MUM and servo signals; and second means for respectively subtracting the plurality of reconstructed MUM signals from the plurality of first signals to develop a plurality of forcing signals having substantially no MUM components to control the operation of the plurality of circuits.

2. The system of claim 1 wherein said first means includes:

pickoff electronics responsive to the plurality of electrode pickoff signals for generating the plurality of first signals; and a MUM reconstruction circuit responsive to the plurality of first signals for developing the plurality of reconstructed MUM signals.

3. The system of claim 2 wherein said second means includes:

means responsive to the plurality of first signals and the plurality of reconstructed MUM signals for developing a plurality of input servo signals having substantially no MUM signal components; and means responsive to the plurality of first signals and to the plurality of input servo signals for developing the plurality of forcing signals.

4. The system of claim 2 wherein said MUM reconstruction circuit includes:

demodulation means for removing the servo signals from each of the combinations of MUM and servo signals, leaving only the MUM signals;

transformation means for transforming the remaining MUM signals into three-space MUM signals; and modulation means for developing the plurality of reconstructed MUM signals in response to the three-space MUM signals.

5. The system of claim 1 further including:

third means responsive to the reconstructed MUM signals and to a spin frequency signal having a frequency indicative of the speed of the spinning ball for developing a plurality of speed control signals, and second means being responsive to the plurality of speed control signals for respectively adding same to the respective differences between the plurality of first signals and the plurality of reconstructed MUM signals, the forcing signals thereby containing signals to enable the plurality of circuits to also control the spin frequency of the spinning ball.

6. The system of claim 5 wherein said first means includes:
pickoff electronics responsive to the plurality of the electrode pickoff signals for generating the plurality of first signals; and
a MUM reconstruction circuit responsive to the plurality of first signals for developing the plurality of reconstructed MUM signals and the spin frequency signal of the ball.

7. The system of claim 6 wherein said second means includes:
fourth means responsive to the plurality of first signals and the plurality of reconstructed MUM signals for developing a plurality of input servo signals;
fifth means responsive to the pluralities of input servo and speed control signals for developing a plurality of second signals; and
sixth means responsive to the pluralities of first and second signals for developing the plurality of forcing signals.

8. A suspension system for an electrostatic gyroscope of a type which incorporates a plurality of electrodes arranged in a symmetrical array around a mass unbalanced conductive ball, which ball is adapted to be spun around a spin axis, said system comprising:
first means responsive to electrode pickoff signals for generating a plurality of first signals, each of the first signals containing MUM and servo components;
second means responsive to the plurality of first signals for generating a plurality of reconstructed MUM signals and a second signal having a frequency indicative of the speed of the ball as it spins around the spin axis;
third means responsive to the plurality of reconstructed MUM signals and to the second signal for developing a plurality of speed control signals;
fourth means responsive to the first signals and reconstructed MUM signals for internally developing a plurality of servo signals containing substantially no MUM signals, said fourth means including fifth means responsive to the plurality of speed control signals and the plurality of servo signals for developing a plurality of force signals; and
fifth means responsive to the plurality of force signals for selectively applying potentials to the electrodes of each pair to control the positioning and speed of the conductive ball and for developing the electrode pickoff signals.

9. A system comprising:
a spherical conductive ball having a center of mass displaced from the geometric center thereof, said ball being adapted to be spun about a spin axis;
a plurality of electrodes arranged in a symmetrical array around said ball;
a plurality of circuits being responsive to a plurality of force signals containing substantially no mass unbalanced modulation components for respectively supplying a plurality of voltages to said plurality of electrodes to control the positioning and speed of said ball and for generating the plurality of pickoff signals;
a first circuit responsive to a plurality of pickoff signals for generating a plurality of first signals;
a second circuit responsive to the plurality of first signals for developing a second signal indicative of the speed of said spinning ball and for developing a plurality of mass unbalanced modulation third signals therefrom;
a third circuit responsive to the second and third signals from said second circuit for developing a plurality of fourth signals for subsequently controlling the speed of said spinning ball; and
a fourth circuit responsive to the first, third and fourth signals for developing the plurality of force signals to enable and plurality of circuits to control the speed and position of said spinning ball.

10. A suspension system for an electrostatic gyroscope of a type which incorporates four pairs of electrodes arranged in a symmetrical array around a conductive ball, which ball is adapted to be spun around a spin axis, said system comprising:
four amplifier means being respectively responsive to four associated force signals for selectively applying potentials to the four pairs of electrodes to control the positioning and speed of the conductive ball and for developing four pickoff signals, each pickoff signal being indicative of the position of the ball in relation to an axis of suspension associated with a corresponding pair of electrodes;
a pickoff circuit for developing four first signals in response to the pickoff signals;
a reconstruction circuit responsive to the four first signals for developing reconstructed MUM signals in three mutually orthogonal axes, respectively, and for developing a second signal having a frequency indicative of the actual speed of the spinning ball;
a speed control circuit being responsive to the reconstructed MUM signals and to the second signal for developing an associated speed control signal in each of the three mutually orthogonal axes in order to precisely control the actual speed of the spinning ball; and
a servo suspension circuit responsive to the four first signals, the three reconstructed MUM signals and the three speed control signals for developing the four associated force signals to cause said four amplifier means to precisely position and speed-control the spinning ball.

11. The system of claim 10 wherein said reconstruction circuit includes:
means for demodulating the four first signals to develop four-space Fourier coefficients of the MUM signals;
first transformation means for transforming the four-space Fourier coefficients of the MUM signals into three-space Fourier coefficients of the MUM signals; and
means for modulating the three-space Fourier coefficients of the MUM signals to develop the reconstructed MUM signals in three mutually orthogonal axes.

12. The system of claim 11 wherein the servo suspension circuit includes:
a second transformation circuit for transforming the four first signals into three-space composite signals, each of the composite signals containing servo and MUM signal components;
first combining means for respectively subtracting the three reconstructed MUM signals from the three-space composite signals to develop three-space input servo signals substantially without any MUM signal components;

servo network means coupled to said first combining means for providing three-space servo compensated forcing signals in response to the input servo signals;

second combining means for respectively adding the three speed control signals to the forcing signals to develop three-space force signals; and a third transformation circuit for transforming the three-space force signals into the four associated force signals.

13. The system of claim 12 wherein said speed control circuit includes:

a timing circuit for generating a timing signal having a frequency corresponding to a desired speed for the spinning ball;

a frequency comparator being responsive to the timing and second signals for generating a control signal indicative of an error between the actual and desired speeds of the spinning ball; and a speed adjusting circuit for modifying each of the three reconstructed MUM signals as a function of the control signal in order to generate the speed control signals in the three mutually orthogonal axes.

14. A system comprising:

a mass unbalanced conductive ball adapted to be spun around a spin axis;

a plurality of electrodes around said ball;

means responsive to a plurality of forcing signals for selectively applying signals to said electrodes to control the positioning and rotational speed of said ball;

first means coupled to said applying means for developing a plurality of composite signals, a plurality of reconstructed MUM signals and a ball speed signal indicative of the rotational speed of said ball, each of the composite signals containing MUM and servo components;

second means responsive to the ball speed signal and the plurality of reconstructed MUM signals for generating speed control signals; and third means for respectively subtracting the plurality of reconstructed MUM signals from the plurality of composite signals to eliminate the MUM signals and for respectively adding the speed control signals to the differences therebetween to generate the plurality of forcing signals to enable said applying means to control the positioning and rotational speed of said ball.

* * * * *